(12) United States Patent
Aalto

(10) Patent No.: US 6,985,736 B1
(45) Date of Patent: Jan. 10, 2006

(54) INCREASING THE CAPACITY OF A CELLULAR RADIO NETWORK

(75) Inventor: Risto Aalto, Riihimäki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/480,173

(22) Filed: Jan. 10, 2000

Related U.S. Application Data

(63) Continuation of application No. 08/849,711, filed as application No. PCT/FI96/00540 on Oct. 11, 1996, now Pat. No. 6,091,955.

(30) Foreign Application Priority Data

Oct. 13, 1995 (FI) ........................... 954879

(51) Int. Cl.
*H04Q 7/36* (2006.01)
(52) U.S. Cl. .................. 455/447; 455/444; 455/450
(58) Field of Classification Search ........ 455/437–438, 455/443–444, 442, 447, 449–450, 453, 422, 455/67.11, 67.13, 62, 63.1, 511, 524–525; 370/329, 331–332
See application file for complete search history.

(56) References Cited

U.S. PATENT DOCUMENTS

| | | | |
|---|---|---|---|
| 5,038,399 A | 8/1991 | Bruckert | 455/62 |
| 5,285,447 A | 2/1994 | Hulsebosch | 455/437 |
| 5,357,559 A | 10/1994 | Kallin | 455/449 |
| 5,506,869 A | 4/1996 | Royer | 455/67.3 |
| 5,557,657 A | 9/1996 | Barnett | 455/444 |
| 6,091,955 A * | 7/2000 | Aalto et al. | 455/447 |

FOREIGN PATENT DOCUMENTS

| | | |
|---|---|---|
| EP | 530 165 | 3/1993 |
| EP | 531 090 | 3/1993 |
| EP | 675 662 | 10/1995 |
| WO | 95/01706 | 1/1995 |
| WO | 95/23490 | 8/1995 |

* cited by examiner

*Primary Examiner*—Lee Nguyen
(74) *Attorney, Agent, or Firm*—Pillsbury Winthrop Shaw Pittman LLP

(57) ABSTRACT

The invention relates to a cellular radio network and a method for increasing traffic carrying capacity in a cellular network. The operating frequency spectrum of the cellular network has been divided in such a way that typically both regular frequencies and super-reuse frequencies are employed in each cell. The regular frequencies use a conventional frequency reuse pattern to provide seamless overall coverage. A very tight frequency reuse pattern is used for the super-reuse frequencies to provide additional capacity.

17 Claims, 6 Drawing Sheets

Fig. 7

| Base station | Handover threshold 1 | TRX | TRX type | Interfering base stations | |
|---|---|---|---|---|---|
| BTS1 | SuperReuseGoodC<sub>i</sub>Threshold Id (CiRatio, Nx, Px) | TRX1 | REGULAR TRX | | |
| | SuperReuseBadC<sub>i</sub>Threshold Id (CiRatio, Nx, Px) | TRX2 | SUPER-REUSE-TRX | BTS4 | (LevelAdjustment, CIEstWeight, CIEstType) |
| | | | | BTS9 | (LevelAdjustment, CIEstWeight, CIEstType) |
| | | | | ⋮ ⋮ ⋮ | |
| BTS2 | | | | | |

INCREASING THE CAPACITY OF A CELLULAR RADIO NETWORK

This is a continuation of U.S. National application Ser. No. 08/849,711, filed Jun. 12, 1997, now U.S. Pat. No. 6,091,955, and International Application No. PCT/FI96/00540, filed Oct. 11, 1996, which published as WO 97/14260, on Apr. 17, 1997, which in turn claims priority for Finland Patent Application No. 954879 filed Oct. 13, 1995, the contents of all of which are incorporated herein by reference.

FIELD OF THE INVENTION

The present invention relates to cellular radio networks and particularly to methods for increasing the capacity of a cellular radio network.

BACKGROUND OF THE INVENTION

The most significant factor reducing the capacity of radio systems is the limited frequency spectrum available. The capacity of a radio system is thus dependent on how efficiently the radio frequencies allocated to the system can be utilized. In cellular radio networks, enhanced utilization of radio frequencies is based on frequency reuse, the same frequency is reused at several locations that are sufficiently spaced apart, which affords a vast increase in system capacity. This is counteracted by increased complexity in the network as well as in the mobile units which must be capable of selecting a base station from among several possible base stations. For example, if the same frequency is reused in every ninth cell, the spectral allocation of N frequencies permits the use of N/9 carriers simultaneously in any cell. Diminishing the cell size or reducing the distance between cells using the same frequency will enhance capacity on the one hand, but also increases co-channel interference. Therefore, selection of the reuse factor is often a compromise between co-channel interference and the traffic carrying capacity of the system.

Since the frequency spectrum allocated to a cellular radio network is fixed and the number of subscribers is rapidly increasing, efficient use of the allocated frequency spectrum is vital to any network operator. Hence, various features increasing the traffic carrying capacity in the cellular network will provide much-needed relief to operators, particularly in crowded urban areas. Radio network evolution towards high-capacity radio networks has the following main alternatives; increasing the number of channels, splitting the cells (small cells), microcellular networks, multi-layered networks, underlay-overlay networks, and other capacity enhancement concepts, such as half-rate channels, frequency hopping, and power control. In the following, these alternatives will be described in more detail.

Increasing the Number of Channels

The simplest way to supplement capacity is by increasing the number of channels. Since the allocated cellular spectrum per network operator is very limited, this method does not give relief from capacity problems.

Splitting Cells (Small Cells)

When cell sizes are reduced below a radius of 1 km, there generally is a need to lower, the antenna height below rooftop level. This is because coverage to localized areas at street level cannot be efficiently engineered from a rooftop installation. Such lowering of antennas causes problems in designing coverage. Prediction of ranges for these types of installation is less well understood than in cases of macrocells. Furthermore, interference management becomes more difficult from below rooftop installations, as overspill into co-channel base stations cannot be equally controlled. Cell overspill may eventually reduce cell sizes to the point where conventional planning practices and radio systems do not work efficiently. Additionally, any significant capacity enhancement is accompanied by major investments in BTS sites and transmission connections. Splitting of cells is a good method for capacity relief up to a certain point. Unfortunately, urban area capacity requirements are so high that this method does not offer help in the long run. Cell splitting can therefore only be used for short term relief.

Microcellular Network

There is no exact definition of "microcellular network". A cell having a small coverage area and antennas below rooftop level could be the characteristics in the definition of a "microcell". Microcellular concepts are often mistakenly referred to as "multi-tiered", but a "microcell" can be deployed without a multi-layer architecture. In implementing cell splitting below a certain limit and placing antennas below rooftop level or in buildings, advanced solution radio network planning and radio resource control is needed. An increased number of BTS sites significantly increases the costs. For cells with a radius of 300 m −1 km, signal variability due to shadow fading is very high compared to macrocells and relative to the coverage area of the small cells. These factors mean that cell overlaps need to be very high in order to meet the desired overall coverage; this is, of course, inefficient. Cells with a radius below 300 m experience more line of sight signal propagation and somewhat less signal variability, which is helpful from a coverage point of view. However, antenna location in these circumstances very significantly determines the actual coverage area. Localized blockages-which cause serious shadows effectively produce coverage holes. Small antenna location variations significantly alter the effectiveness and characteristics of the BTS site. There are two alternative solutions to these problems: to deploy more cells accepting the inefficiency of high cell overlap, or significantly increase and improve engineering effort in the actual BTS site selection and planning process. Both of these solutions increase the costs to the operator. The net result is that a microcellular network does not give a significant capacity increase without major investment in BTS sites and transmission connections.

Underlay-Overlay Network

To cope with the two conflicting goals in radio network design, i.e., coverage and capacity, it is possible to build a radio network which has two (or more) separate cell layers, one, e.g., a macrocell layer, providing overall coverage and the other, e.g., a microcell layer, providing capacity. The "coverage layer" uses a conventional frequency reuse pattern and cell range to provide seamless overall coverage. The "capacity layer" uses a very tight frequency reuse pattern and a shorter cell range to achieve high capacity with a few channels. Multi-layered networks are often also referred to as "underlay-over-lay" networks.

In an underlay-overlay network, there are many ways to control the handover between layers. The handover decision can be made on the basis of field strength or power budget values. In this case, the interference level must be predefined for each BTS site and the handover thresholds and transmit power are adjusted to minimise the interference. The interference control is always a statistical method and the resulting average quality is therefore not a quality guarantee for a single connection. For this reason, the achieved increase in capacity is questionable.

SUMMARY OF THE INVENTION

It is an object of the present invention to improve frequency utilization in an underlay-overlay cellular radio network without increase in co-channel interference, and thereby to significantly improve capacity without any major additional investments or extensive modifications to the network.

This and other objects of the invention will be achieved with a cellular-radio network in which allocated radio frequencies are divided into regular radio frequencies for which lower frequency reuse is utilized to achieve a seamless overall coverage, and super-reuse frequencies to which high-frequency reuse is applied to provide a high traffic carrying capacity.

At least some of the cells have both at least one regular frequency and at least one, super-reuse frequency, so that at least one regular frequency is intended to serve primarily in cell boundary regions and at least one super-reuse frequency is intended to serve primarily in the vicinity of the base station.

means controlling or a controller which controls traffic load distribution in the cell between at least one regular and least one super-reuse frequency by intra-cell handovers induced by estimated interference on said at least one super-reuse frequency.

The invention also relates to a method for increasing traffic carrying capacity in a cellular radio system. The method includes dividing the radio frequencies of the cellular radio network into regular radio frequencies for which lower frequency reuse is utilized to achieve seamless overall coverage, and super-reuse frequencies to which higher frequency reuse is applied to provide a high traffic carrying capacity, allocating to at least some of the cells both at least one regular frequency and at least one super-reuse frequency so that the regular frequency is intended to serve primarily in cell boundary regions and the super-reuse frequency is intended to serve primarily in the vicinity of the base station, and controlling traffic load distribution in the cell between at least one regular and at least one super-reuse frequency by intra-cell handovers induced by estimated interference on said at least one super-reuse frequency.

In the invention, the operating frequency spectrum of the cellular network is divided into regular frequencies and super-reuse frequencies. By these two sets of frequencies, two or more separate network layers are provided, at least locally, in the cellular radio network so that typically both regular frequencies and super-reuse frequencies are employed in each cell.

One layer, the 'overlay layer', utilizes regular frequencies and a conventional frequency reuse pattern and cell coverage to achieve seamless overall coverage. Frequency planning for regular frequency reuse is made by conventional criteria using safe handover margins and requiring low co-channel and adjacent channel interference probabilities. Regular frequencies are intended to serve mobile stations mainly at cell boundary areas and other locations where the co-channel interference ratio is poor. The overlay network also provides interference-free service in the overlapping cell areas required for handover control and neighboring cell measurements by mobile stations.

Another layer (or several other layers), the 'underlay layer', is composed of super-reuse frequencies. The underlay network employs a very tight frequency reuse pattern to provide extended capacity. This is based on the fact that in the underlay network the same frequency is reused more often than in the overlay network, and hence, more transceivers can be allocated within the same bandwidth. If the frequency reuse is, for example, twice as tight as originally, the number of transceivers can be doubled. The super-reuse frequencies are intended to serve mobile stations which are close to the BTS, inside buildings and at other locations where the radio conditions are less vulnerable to interference.

The cellular network controls traffic division into regular and super-reuse frequencies of radio resource allocation at the call set-up phase and later on during the call by handover procedures. The capacity increase actually provided by such an underlay-overlay network is essentially dependent on how efficiently the mobile stations can be directed to use the super-reuse frequencies and how well call quality deterioration resulting from co-channel interference caused by an increased level of frequency reuse can be avoided.

In accordance with the invention, this problem is solved by directly and dynamically controlling the co-channel interference level of each specific call. The radio network estimates the degree of interference on different frequencies and directs the mobile stations to those frequencies that are sufficiently "clean" of interference to sustain a good radio connection quality. More precisely, the cellular network continuously monitors the downlink co-channel interference of each super-reuse frequency in the cell individually for each on-going call. The call is handed over from a regular frequency to a super-reuse frequency when the co-channel interference level on the super-reuse frequency is sufficiently good. When the co-channel interference level on the super-reuse frequency deteriorates, the call is handed over from the super-reuse frequency back to a regular frequency. Based on the profile of interference each mobile is exposed to, the cellular network determines the most appropriate frequency for the call connection. The use of measured co-channel interference level as a handover decision criterion guarantees that the same interference requirements are met for any single cell.

In a first embodiment of the invention, the cell is provided with both regular and super-reuse frequencies, so that the BCCH frequency of the cell is one of the regular frequencies, whereas the super-reuse frequency is never a BCCH frequency. Call set-up and handover from another cell is always first carried out to a regular frequency in the cell, whereafter an underlay-overlay handover in accordance with the invention to a super-reuse frequency of the cell may be performed.

Stand-alone microcells may be configured solely to use the super-reuse frequencies. Such a microcell is termed a child cell herein. By establishing appropriate handover connections, a child cell at a good location, i.e. a traffic hot spot, can handle more traffic than a regular cell in its vicinity. A child cell is an independent cell having a super-reuse frequency as its BCCH frequency. Traffic is conveyed to the child cell by means of a handover, since call set-up to the child cell is not possible (only super-reuse frequencies, the interference level cannot be measured prior to call set-up).

In the first embodiment of the invention, the co-channel interference level is estimated by comparing the downlink signal level of the serving cell and the downlink signal levels of those neighbouring cells which use the same super-reuse frequencies as the serving cell. The radio network can calculate the estimated co-channel interference level at the location of each active mobile station. The calculation of the co-channel interference is based on the measurement results on the BCCH frequencies of the mobile station, which the mobile station measures also for a normal handover and reports to the cellular network. In fact, one of the advantages of the invention is that it does not require any modifications to mobile stations in conventional cellular networks.

BRIEF DESCRIPTION OF THE DRAWINGS

The invention will be explained in the following by means of preferred embodiments with reference to the accompanying drawing, in which FIG. 7 illustrates base station-specific and transceiver-specific parameters set in the database of the base station controller.

DETAILED DESCRIPTION OF THE CURRENTLY PREFERRED EMBODIMENT OF THE INVENTION

The present invention can be applied to all cellular radio systems.

The present invention is particularly suited to cellular systems employing mobile-assisted cellularly controlled handover, such as the pan-European digital mobile communication system GSM (Global System for Mobile Communications) and in other GSM-based systems, such as DCS 1800 (Digital Communication System), and in the U.S. digital cellular system PCS (Personal Communication System). The invention will be described in the following by using the GSM mobile communication system as an example. The structure and operation of the GSM system are well known to those skilled in the art and are defined in the GSM specifications of ETSI (European Telecommunications Standards Institute). Furthermore, reference is made to M. Mouly & M. Pautet, *GSM System for Mobile Communication*, Palaiseau, France, 1992; ISBN: 2–9507190-0-7.

Figure 1:
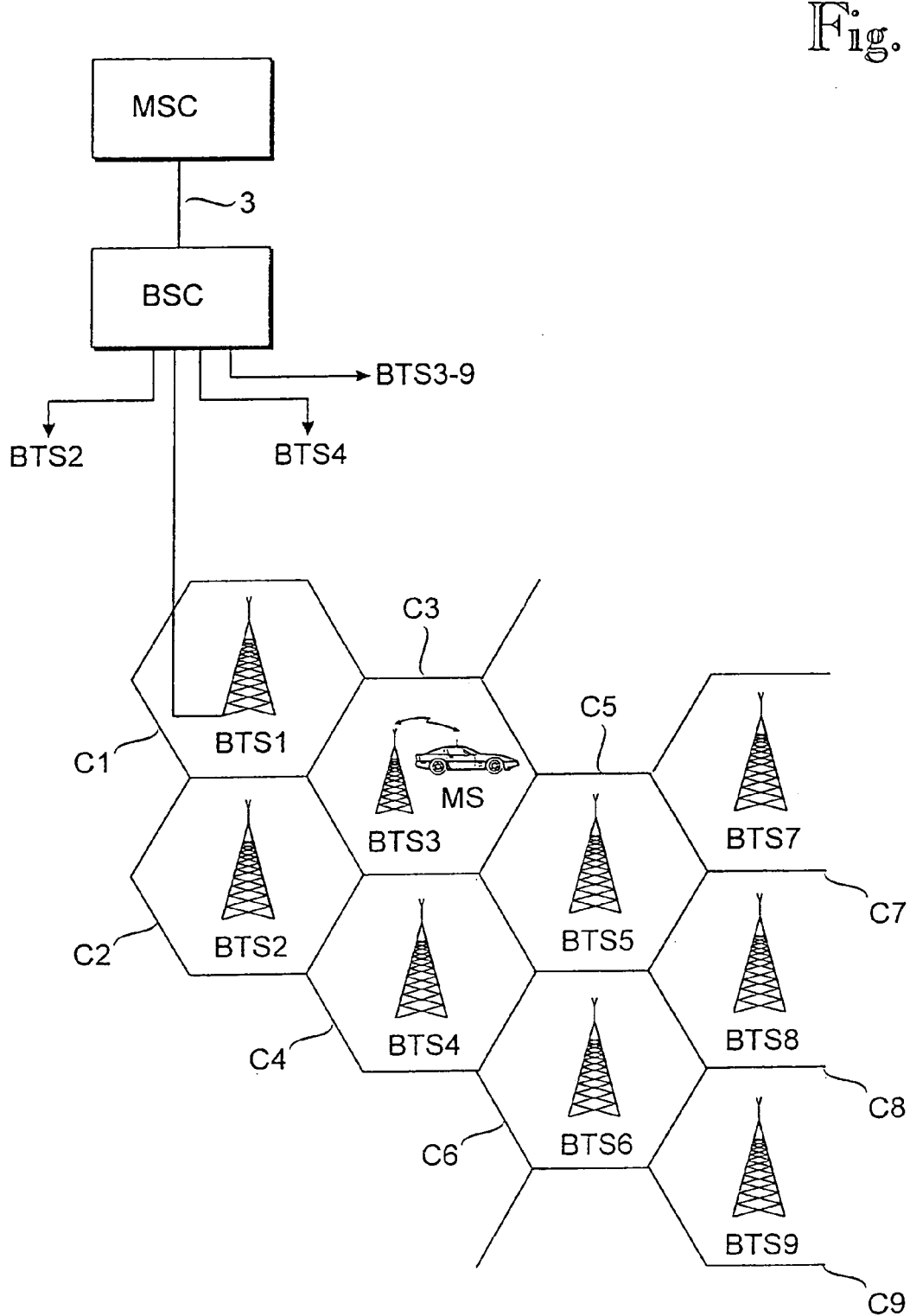
FIG. 1 illustrates a part of a cellular radio system in which the invention can be applied.

The general structure of a GSM-type cellular network is illustrated in FIG. 1. The network is composed of two parts: a Base Station Subsystem BSS and a Network Subsystem (NSS). The BSS and mobile stations MS communicate via radio links. In the base station subsystem BSS, each cell is served by a base station BTS. A number of base stations are connected to a base station controller BSC, the function of which is to control the radio frequencies and channels employed by the BTS. The tasks of the BSC also include handovers in cases where the handover is performed within the BTS or between two BTSs both of which are controlled by the same BSC. The BSCs are connected to a mobile services switching center MSC. Certain MSCs are connected to other telecommunications networks, such as the public switched telephone network PSTN, and comprise gateway functions for calls to and from such networks. Such MSCs are known as gateway MSCs (GMSC).

For clarity, FIG. 1 shows only one MSC and one base station subsystem in which nine base stations BTS1–BTS9 are connected to a base station controller BSC, the radio areas of the base stations constituting respective radio cells C1–C9.

1.0 Conventional Cellular Network

The cellular network can be drawn as a combination of circles or hexagons, such as cells C1–C9 in FIG. 1. A hexagonal cell is quite different from the actual world, but is still a good way of approximating the network. The cells may have different configurations, such as omni, bisectoral, trisectoral, etc.

Figure 2:
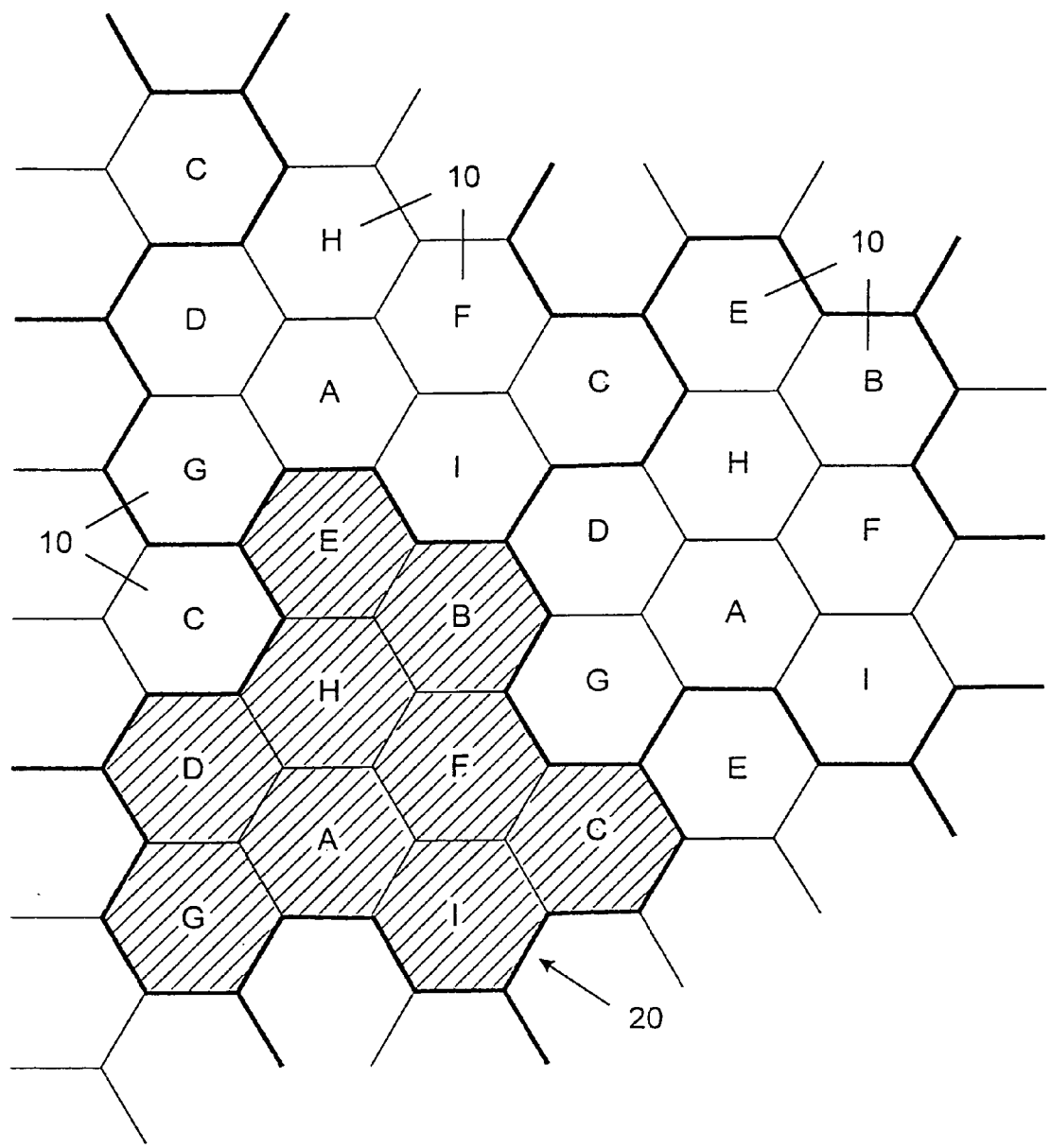
FIG. 2 illustrates a conventional cellular radio network employing one frequency reuse pattern.

The basic principle of a cellular network is frequency reuse, in other words, the same frequency is reused in cells with a given spacing. Reuse is usually represented by a frequency reuse pattern, composed of a cluster of cells using different frequencies. Cluster size, i.e., the number of cells in a cluster, is often used as a yardstick for the reuse factor. For example, in FIG. 2, the reuse pattern or cluster 20 comprises 9 cells using mutually different frequencies or sets of frequencies A, B, C, D, E, F, G, H, and I. The same frequencies are reused in clusters of the same size throughout the cellular network. The cluster size, cell size and spacing between two cells using the same frequency are determined by the desired C/I (carrier-to-interference) ratio, which is the ratio of the desired receiving signal level to the received interference signal. The most significant interference is usually co-channel interference from another cell using the same frequency. This causes the planning problem stated in connection with the description of the prior art: Enhancement of frequency reuse, e.g., reducing cell size, increases the traffic carrying capacity but also the co-channel interference. One prior art solution is a multilayer network having a "coverage layer" provided by one cell layer, e.g., macrocell network, and a "capacity layer" provided by one cell layer, e.g., microcell network. However, forming of the other cell layer requires considerable investment and modifications to the network. Furthermore, handover control between the layers has been based on the field strength or power budget, and thus the connection quality and capacity increase achieved in the cellular network are questionable, as explained above in connection with the prior art.

1.1. Conventional Handover

As is well known, mobile stations MS can roam freely within the area of the mobile communication system from one cell to another. Handover is only re-registration with another cell when the mobile station does not have any ongoing call. When the mobile station MS has an ongoing call during the handover, also the call must be connected from one base station to another in a way least disturbing to the call. Transfer of a call from a traffic channel to another traffic channel of the same cell or another cell during a call is termed a handover.

Handover decisions are made by the base station controller BSC on the basis of the different handover parameters set for each cell and on the measurement results reported by the mobile station MS and the base stations BTS. Handover is normally induced on the basis of the criteria for the radio path, but handover may also be due to other reasons, including load distribution. The procedures and calculation on the basis of which the handover decision is made are called a handover algorithm.

For example in accordance with the technical recommendations for the GSM system, the mobile station MS monitors (measures) the downlink signal level and quality of the serving cell and the downlink signal level of the cells surrounding the serving cell. The MS is capable of measuring 32 cells at most and reporting the measurement results of the six best BTS to the BSC. The BTS monitors (measures) the uplink signal level and quality, received from each mobile station MS served by said base station BTS. All measurement results are forward to the BSC. Alternatively, all handover decisions can be made in the MSC. In that case, the measurement results are forwarded to the MSC as well. The MSC also controls at least those handovers that are made from the area of one BSC to the area of another BSC.

When the MS roams in the radio network, handover from the serving cell to a neighboring cell is normally effected either when (1) the measurement results of the MS and/or BTS show a low signal level and/or signal quality for the downlink signal of the currently serving cell and a better signal level is to be obtained from a neighboring cell, or when (2) one of the neighboring cells permits communication at lower transmit power levels, i.e., when the MS is located in the boundary region of cells. In radio networks, unnecessarily high power levels and thereby interference to other parts of the network are avoided as far as possible. The BSC selects, on the basis of the handover algorithm employed in the system and the reported measurement results, the neighbouring cells whose radio path has properties sufficient for a possible handover. These selected neighboring cells are called handover candidate ells in this context, and the final target cell for handover is selected from these. At its simplest, the selection of the target cell may be effected by selecting a candidate cell having the best radio path properties, i.e., the best signal level. The candidate cells may, however, be ranked according to specific priority levels on other grounds as well.

2.0 Underlay-Overlay Network in Accordance with the Invention

Figure 3:
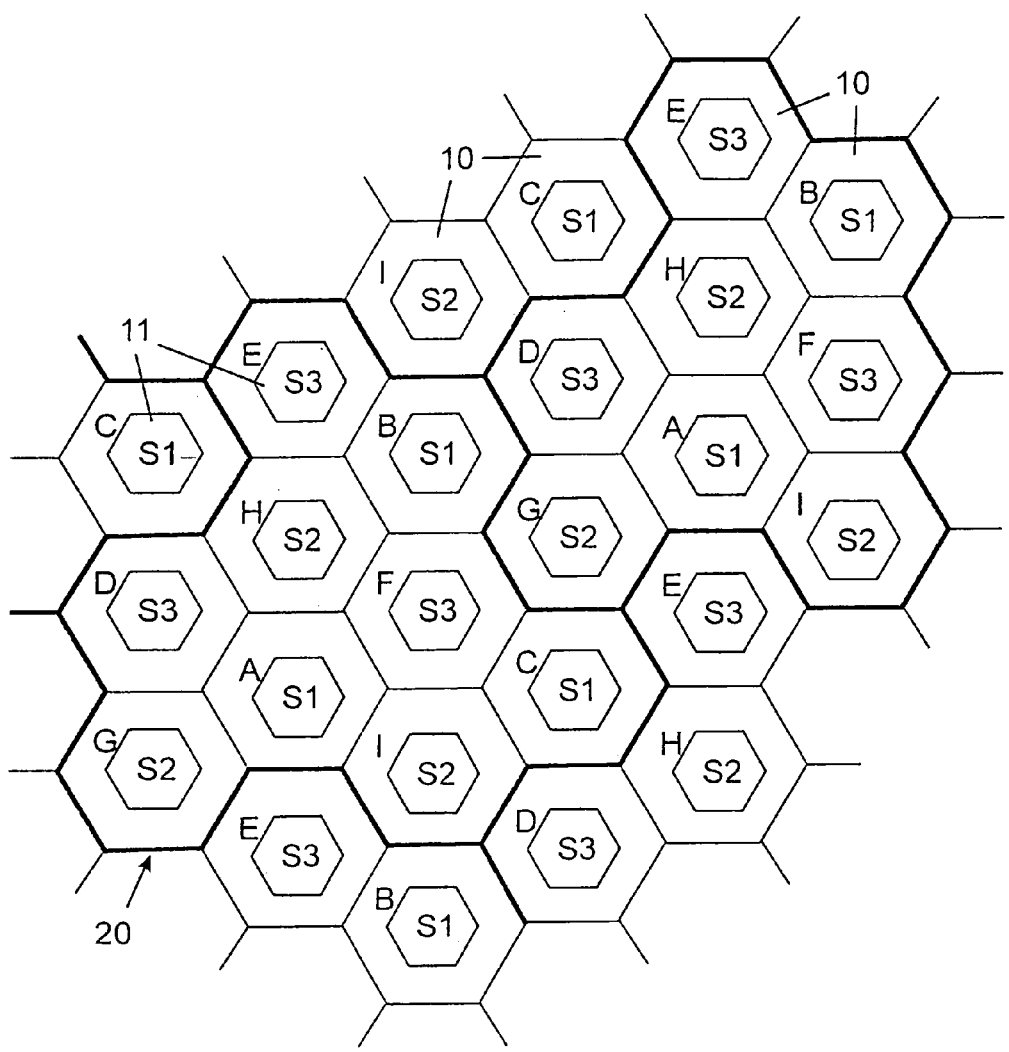
FIG. 3 illustrates a cellular network in accordance with the invention, employing regular and super-reuse frequencies.
Figure 4:
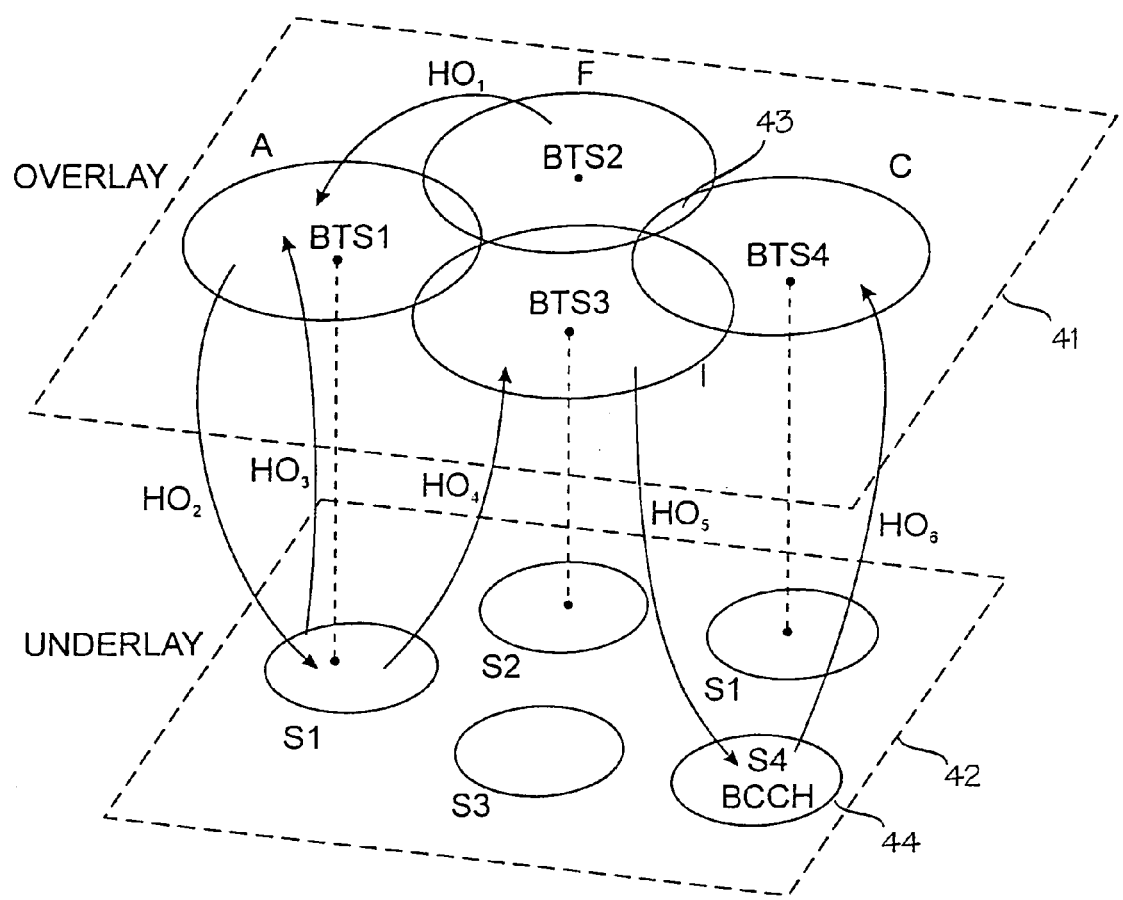
FIG. 4 illustrates underlay and overlay layers provided by the super-reuse frequencies and regular frequencies respectively in the network of FIG. 3.

In the invention, the operating frequency spectrum of the cellular network is divided into regular frequencies and super-reuse frequencies. By means of these two sets of frequencies, two or more separate "network layers" are provided, at least locally, in the cellular radio network in such a way that typically both regular frequencies and super-reuse frequencies, to which mutually different reuse factors are applied, are employed in each cell. An exception is made by a child cell, which will be described in detail below. FIG. 3 illustrates a cellular network in accordance with the invention, which has been formed by adding super-reuse frequencies into the cells of the conventional cellular network of FIG. 2. FIG. 4 illustrates how the regular and super-reuse frequencies in the cells form two separate "network layers" in the frequency domain.

One layer 41, the 'overlay layer', utilizes the regular frequencies of cells 10, i.e., A, B, C, D, E, G, H, and I, and a conventional frequency re-use pattern and cell radius to produce seamless overall coverage. Frequency planning for regular frequency reuse is made by conventional criteria using safe handover margins and requiring low co-channel and adjacent channel interference probabilities. Regular frequencies are intended to serve mobile stations mainly at cell boundary areas and other locations where the co-channel interference ratio is poor. The overlay network also provides interference-free service in the overlapping cell areas required for handover control and neighboring cell measurements by a mobile station. Hence, an overlay network is typically a conventional cellular radio network. It may also be a cell layer in a network comprising two physical cell layers, e.g., a macrocell, microcell or picocell layer. In such a case, the frequency spectrum division in accordance with the invention is carried out within the physical macrocells, microcells or picocells. In the example of FIGS. 3 and 4, the overlay network is a unidimensional cellular network in accordance with FIG. 2 in which the cluster size is 8.

Another layer (or several other layers) 42, the 'underlay layer', is composed of the super-reuse frequencies S1, S2, and S3 of the cells. It is thus to be noted that the invention typically employs only one physical cell layer and that the overlay and underlay layers are not made up by different physical cells by different frequencies or sets of frequencies in the same physical cell. The underlay network employs a very tight frequency reuse pattern, so that a smaller coverage, represented by a small hexagon 11 in FIG. 3, is created for the super-reuse frequencies within regular cell 10. Provision of extended capacity is based on the fact that in the underlay network the same frequency can be reused more often than in the overlay network, and hence more transceivers can be allocated within the same bandwidth. In the example of FIGS. 3 and 4, the cluster size of the underlay layer is 3, and thus the number of transceivers per frequency can be nearly tripled compared with the overlay layer (cluster size 8): The super-reuse frequencies are intended to serve mobile stations which are close to the BTS, inside buildings and at other locations where the radio conditions are less vulnerable to interference. As illustrated in FIGS. 3 and 4, the super-reuse frequencies do not provide continuous coverage but rather form separate islands. However, it is possible, depending on the frequency reuse factor, that also the super-reuse frequency coverages overlap.

A cellular network may employ several sets of super-reuse frequencies to which similar or different reuse is applied independently. Each set of super-reuse frequencies thus forms a distinct underlay "network layer".

Division of cell frequencies into regular and super-reuse frequencies is controlled transceiver-specifically at the base station BTS. All radio transceivers (TRX) at the BTS are defined either as regular TRXs or super-reuse TRXs (a child cell is an exception). The radio frequency of a regular TRX is among the regular frequencies, i.e., A–I. The radio frequency of a super-reuse TRX is one of the super-reuse frequencies, i.e., S1, S2 and S3. Each BTS must additionally have a 'broadcast control channel frequency' (BCCH frequency) which is measured by the MS in adjacent cell measurements, for example. In a first embodiment of the invention, the BCCH frequency is always one of the regular frequencies. A child cell again makes an exception; therein the BCCH frequency is a super-reuse frequency.

Figure 5:
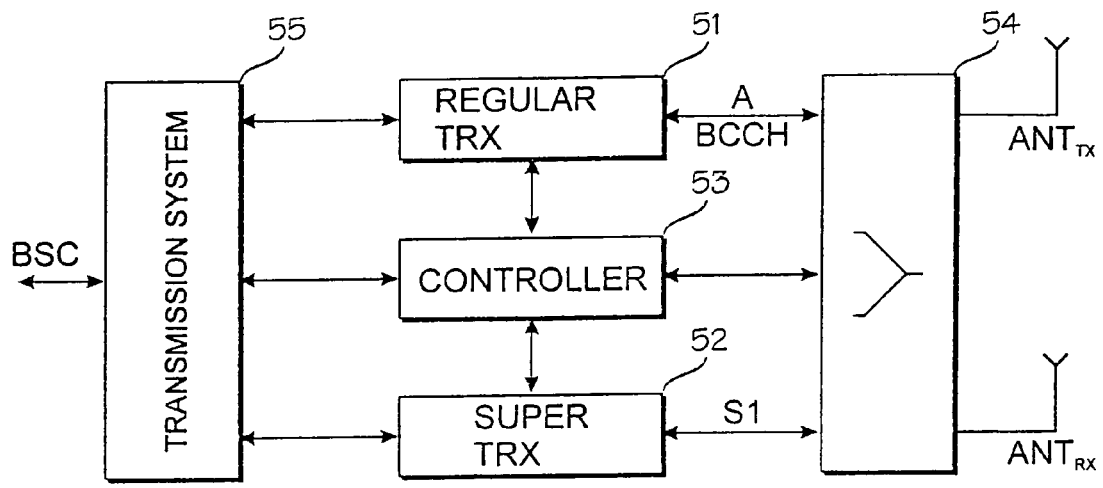
FIG. 5 represents a schematic block diagram of a base station in accordance with the invention.

The base station BTS of cell 10 is typically furnished with both types of TRX. FIG. 5 illustrates a BTS in accordance with the invention, comprising two TRXs 51 and 52. It is to be noted, however, that there may be any desired number of TRXs. TRX 51 is a regular TRX whose radio frequency A is one of the regular frequencies and also provides the BCCH frequency for the cell.

TRX 52 is a super-reuse TRX whose radio frequency S1 is one of the super-reuse frequencies. TRXs 51 and 52 are connected via a combiner and divider unit 54 to common transmitting and receiving antennas $ANT_{TX}$ and $ANT_{RX}$. Regular and super-reuse frequencies may also have separate antennas, for instance to obtain as advantageous a coverage as possible for the super-reuse frequencies. TRXs 51 and 52 are further connected to transmission system equipment 55 providing connection to a transmission link to the BSC, e.g., a 2 Mbit/s PCM link. The operation of the TRXs 51 and 52 is controlled by controller unit 53 having a signalling connection with the BSC through the transmission system equipment 55. The BTS in accordance with the invention may be a fully commercial base station, e.g., GSM Base Station DE21 by Nokia Telecommunications Oy. What is essential to the invention is the division of the frequencies used by the TRXs.

An exception to the cell and base station principle presented above is a 'child cell'. A child cell is an individual physical microcell having a suitable location, e.g., a traffic hot spot, and configured to use super-reuse frequencies only. In other words, in view of frequency spectrum division, the child cell is located on one of the underlay layers and is capable of handling more traffic than a regular cell in its vicinity by establishing appropriate handover connections. Since a child cell is an independent cell, it employs a super-reuse frequency as its BCCH frequency. For a child cell, however, in the primary embodiment of the invention a barring parameter preventing call set-up directly to the child cell is sent on the BCCH frequency. Thus, a child cell can only be reached by handover from an adjacent regular cell, which is termed a parent cell. FIG. 4 shows a child cell 44 having a super-reuse frequency S4.

Figure 6:
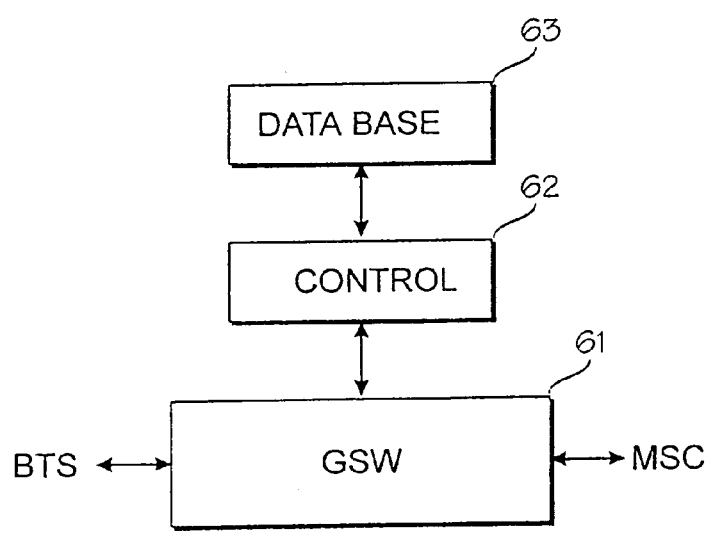
FIG. 6 represents a schematic block diagram of a base station controller in accordance with the invention.

The cellular network, in the primary embodiment of the invention a BSC, controls traffic division into regular and super-reuse frequencies by means of radio resource allocation at the call set-up phase and later on during the call by means of handover procedures. FIG. 6 shows a schematic block diagram of a BSC. A group switch GSW 61 provides the connection operation of the BSC. Besides routing calls between the base stations BTS and the MSC, the group switch GSW is employed to connect calls in intra-BSC handovers. Controller unit 62 handles all control operations within the base station subsystem BSS, such as the execution of handover algorithms. Network configuration database 63 contains all handover and configuration parameters of the base station subsystem BSS. All parameters required by the underlay-overlay feature in accordance with the invention are stored in the database 63. One of the base station-specific and TRX-specific parameter settings included in the database 63 is depicted in FIG. 7; herein TRX-specific parameters define, for instance, whether a regular or a super-reuse TRX is concerned. The other parameters will be described in detail below. The present invention only requires the modifications to be more closely described below to the functions of the controller unit 62 and to the parameter settings in the database 63. Otherwise the BSC of the invention can be implemented with any commercial BSC.

3.0 Intelligent Underlay-Overlay Handover 3.1 General principle

The capacity increase practically provided by the underlay-overlay network of the invention is dependent on how efficiently the mobile stations MS can be directed to use the super-reuse frequencies and how well call quality deterioration is simultaneously avoided.

In the invention, the BSC controls traffic division into regular and super-reuse frequencies by means of radio resource allocation at the call setup phase and later on during the call by means of a handover. The BSC allocates a traffic channel to the call to be set up or to a call handed over from another regular cell at a regular TRX only, wherefore a regular cell must have at least one regular TRX, typically a BCCH TRX, as illustrated in FIG. 5. After this, the BSC monitors the downlink C/I ratio on each super-reuse frequency of the regular cell separately for each ongoing call. The monitoring is accomplished in such a way that the BSC calculates the downlink C/I ratio of the super-reuse TRX by means of various parameters and by means of measurement results reported by the MS via the BTS. The principle of the C/I evaluation is simple. By comparing the downlink signal level of the serving cell (C= Carrier) and the downlink signal levels of the neighbouring cells (I=Interference) which use the same super-reuse frequencies as the serving cell, the BSC can calculate the C/I ratio on the super-reuse frequencies at the location of each active mobile station MS. The C/I can be calculated in this way, since the downlink transmit power is the same on the regular and super-reuse frequencies of the cell.

Example: A super-reuse frequency 90 has been allocated to cells A and B, and the cells are close enough to each other to cause interference. When the downlink signal level of the serving cell A is −70 dBm and the signal level of the adjacent cell B is −86 dBm, the downlink C/I ratio of the super-reuse TRX (frequency 90) of cell A is 16 dB.

The BSC always hands the call from the regular TRX over to the super-reuse TRX when the downlink C/I ratio of the super-reuse TRX is sufficiently* good (handover $HO_2$ in FIG. 4). If the downlink C/I ratio of the super-reuse TRX becomes poor, the BSC again hands the call from the super-reuse TRX over to the regular TRX in the same cell (handover $HO_3$ in FIG. 4). If there is also a child cell under the BSC—such as child cell 44 in FIG. 4—which is adjacent to the regular/serving cell, the BSC continuously monitors the downlink C/I ratio of each super-reuse frequency of the child cell during each call. The call is handed over from the regular cell to the child cell when the downlink C/I ratio of the child cell is sufficiently good (handover $HO_5$ in FIG. 4). If the downlink C/I ratio of the child cell becomes poor, the call is handed over from the child cell to one regular/parent cell adjacent to the child cell (handover $HO_6$ in FIG. 4).

The above-described radio resource allocation and handovers together form an intelligent underlay-overlay feature in the cellular network; this feature is controlled by means of various parameters as illustrated in FIG. 7. These required parameters are stored in the network configuration database 63 at the BSC (FIG. 6). The network operator can administer the parameters for example through the operations and maintenance centre OMC of the network. The underlay-overlay feature in accordance with the invention has special requirements for every stage of the handover algorithm: processing of measurement results, threshold comparison and decision algorithm. Nevertheless, the intelligent underlay-overlay feature in accordance with the invention is still compatible with the above-described standard handover algorithm. This is due to the fact that the BSC uses different handover decision algorithms for handovers arising from traffic control between regular and super-reuse frequencies than for handovers arising from conventional radio path criteria, such as power budget, low signal level or poor signal quality.

In the following, the main steps of the underlay-overlay handover in accordance with the invention are described in detail, these steps being: 1) processing of radio link measurements, 2) C/I determination procedure, 3) handover threshold comparison, and 4) selection of a handover candidate.

3.2 Processing of Radio Link Measurements

As stated previously, underlay-overlay handover decisions made by the BSC are based on measurement results reported by the MS and on various parameters. Database 63 at the BSC is capable of maintaining a measurement table of 32 neighboring cells per each call and storing the measurement results as they arrive. Furthermore, a specific number of interfering cells has been defined for each super-reuse TRX, as illustrated in FIG. 7. The interfering cells must be adjacent to the serving cell, as the MS only measures cells defined in the list of neighboring cells. In the first primary embodiment of the invention, for the BSC to be able to monitor several super-reuse TRXs and cells interfering with them simultaneously for one call, it must be possible to define five interfering cells at most to each super-reuse TRX. This enables simultaneous monitoring of all super-reuse TRXs at the BSC.

The information on the cells being measured is sent to the MS in a neighboring cell list. The MS measures the cells defined in the list and reports the measurement results of the six strongest neighboring cells to the BSC. The interfering cells must be adjacent to the serving cell, otherwise the MS is not capable of measuring and reporting the signal levels of the interfering cells. In any case, the measurement results of the interfering cells are often weaker than those of the six strongest cells neighboring, wherefore the measured downlink level RXLEV of the interfering cell is available only intermittently.

When the RXLEV of the interfering cell is missing from the measurement results, the steps to be taken vary depending on whether the RXLEV of the interfering cell is considered as a directly measured interference level or whether the RXLEV of the interfering cell is a reference value which is used for calculating an interference level estimate, as will be explained in item 3.3.

1) Directly measured interference level. When the MS reports the measurement results of the six neighboring cells, that is, the six positions in the measurement sample are occupied, the weakest RXLEV of the six reported cells is entered as the measurement value for those interfering cells that are missing from the measurement sample. When the MS reports the measurement results of less than six neighbouring cells, a zero is entered as the measurement value for those interfering cells that are missing from the measurement sample.

2) The measurement value is used for calculating an interference level estimate. For those cells whose measurement values are used for calculating an interference level estimate and are missing from the measurement sample, a zero is entered as the measurement value.

In order for the result to have maximum reliability, the BSC can calculate an average of several measurement results, which is then used in the C/I evaluation.

3.3. C/I Evaluation

C/I evaluation is carried out each time the BSC receives measurement results and an average of these is calculated.

If the call is on a regular TRX, the C/I evaluation concerns every super-reuse TRX of the serving cell and those child cells which are adjacent to the serving cell. In such a case, the evaluation strives to find a super-reuse TRX having a sufficiently good C/I ratio for handover.

If the call has been handed over to a super-reuse TRX, the C/I evaluation concerns only the super-reuse TRX itself. In such a case, the purpose of the evaluation is to monitor whether the C/I ratio of the super-reuse frequency is good enough or whether the call is to be handed over to a regular frequency.

The BSC calculates the downlink C/I ratio of the super-reuse TRX in the manner set out above by the processed measurement results (averages) and the parameters set for said TRX. The processed measurement results are the downlink RXLEV of the serving cell, the downlink RXLEV of the interfering cells and the downlink RXLEV of the child cell. The parameters are Level Adjustment, CIEstWeight and CIEstType; these are set for the TRX in database BSC (FIG. 7). Level Adjustment is the adjustment level of the interfering cell (−63 dB . . . 63 dB), which is used to calculate an interference level estimate from the signal level of the interfering cell. CIEstWeight is the weighting coefficient of the interfering cell (1 . . . 10). CIEstType indicates whether the signal level of the interfering cell is considered as a directly measured interference level or whether the signal level of the interfering cell is a reference value which is used for calculating an interference level estimate.

By comparing the downlink RXLEV of the super-reuse TRX and the downlink interference level, the BSC can calculate the C/I ratio of the super-reuse TRX.

3.3.1. Calculation of the RXLEV of the Super-Reuse TRX

For the above comparison, the RXLEV of the super-reuse TRX must first be determined.

In the following, cases in which the super-reuse TRX is allocated to a regular cell (case 1) or to a child cell (cases 2 and 3) are considered.

1) The average downlink receiving level AV_RXLEV_TRX(k) of the super-reuse TRX of a regular cell is calculated in the following way:

$$(AV\_RXLEV\_TRX(k) = AV\_RXLEV\_DL\_HO + (BS\_TXPWR\_MAX - BS\_TXPWR)) \quad (1)$$

where AV_RXLEV_DL_HO is the average downlink RXLEV of the serving cell. BS_TXBWR_MAX−BS_TXBWR is the difference between the maximum downlink RF power permitted in the serving cell and the actual downlink power due to the BTS power control.

2) When the child cell is the handover candidate, the average downlink receiving level AV_RXLEV_TRX(k) of the super-reuse TRX equals the average downlink receiving level of the child cell.

3) When the child cell is the serving cell, the average downlink receiving level AV_RXLEV_TRX(k) of the super-reuse TRX is calculated in the following way:

$$AV\_RXLEV\_TRX(k) = AV\_RXLEV\_DL\_HO + (BS\_TXPWR\_MAX - BS\_TXPWR) \quad (2)$$

3.3.2. Directly Measured Interference Level

The most common situation is that the interfering cell is a regular cell which is adjacent to the serving cell and the interfering cell has the same set of super-reuse frequencies as the serving cell. Also the location of the interfering cell is close enough to cause interference. In this situation, the average downlink receiving level AV_RXLEV_INFx(k) of the interfering cell corresponds directly to the interference level I on the super-reuse TRX caused by the interfering cell.

3.3.4. Estimated Interference Level

If the call is on a super-reuse TRX (BCCH frequency) of the child cell or the child cell is a handover candidate and the potential source of interference is another child cell with the same super-reuse frequency (also BCCH frequency), the corresponding interference level cannot be directly measured and reported by the MS because of the same BCCH frequencies. In this case, the BSC can only estimate the level of interference caused by the other child cell by means of the signal levels which the MS can measure and report.

If the RF signal profile of a regular adjacent cell is similar to the interference profile within the coverage area of the serving cell, it is possible to define the regular adjacent cell as the interfering cell (reference cell) instead of the true source of interference. The RF signal profile is considered the same as the interference profile when the ratio between the RF signal level and the interference level (for example 6 dB) remains approximately unchanged within the service area of the serving cell. This ratio is represented by means of the above parameter LevelAdjustment set for each interfering or reference cell, as illustrated in FIG. 7. The type of the adjacent cell is indicated by means of the parameter CIEstType.

3.3.3.1 Interference Level Estimation Based on Several Cells

In order to increase the reliability of the estimation, several reference cells may be used for calculating the estimated downlink interference level $AV\_RXLEV\_ESTM(k)$. $AV\_RXLEV\_ESTM(k)$ and the downlink C/I ratio of the super-reuse TRX are calculated by using similar evaluation methods. Various mathematical methods, such as the average taking method and the maximum taking method, can be used to calculate the downlink C/I ratio of the super-reuse TRX or the estimated downlink interference level. A cellular network may employ several calculation methods, which are selected for instance cell-specifically by means of special parameters. The average taking method will be described by way of example in the following.

Average Taking Method

The estimated downlink interference level $AV\_RXLEV\_ESTM(k)$ is calculated by means of the average taking method in the following way (when only the RXLEVs of the reference cells are taken into account):

$$AV\_RXLEV\_ESTM(k)=$$

$$[W1(k)*(AV\_RXLEV\_INTF1(k)+$$

$$LEV\_ADJ\_INTF1(k))+$$

$$W2(k)*(AV\_RXLEV\_INTF2(k)+LEV\_$$

$$ADJ\_INTF2(k))]/[W1(k)+W2(k)+W3(k)+W4(k)+$$

$$W5(k)] \quad (3)$$

The downlink C/I ratio $CI\_RATIO(k)$ of the super-reuse transceiver TRX(k) is calculated by the average taking method in the following way (when only the RXLEVs of the interfering cells are taken into account; instead of the RXLEVs of the reference cells, the downlink interference level $AV\_RXLEV\_ESTM(k)$ estimated by means of equation 3 is used):

$$CI\_RATIO(k)=$$

$$[W3(k)*(AV\_RXLEV\_TRX(k)-AV\_RXLEV\_$$

$$INTF3(k)-+W4(k)*(AV\_RXLEV\_TRX(k)-AV\_$$

$$\_RXLEV\_INTF4(k)-LEV\_ADJ\_{INTF}4(k))]+,$$

$$1*(AV\_RXLEV\_TRX(k)-AV\_RXLEV\_ESTM(k))]/$$

$$(W3(k)+W4(k)+1) \quad (4)$$

$LEV\_ADJ\_INFTx(k)$ is the adjustment parameter (LevelAdjustment) of the interfering/reference cell and $Vx(k)$ is the weighting coefficient of the interfering/reference cell (parameter CIEstWeight, set for each interfering cell).

3.4. Handover Threshold Comparison

The underlay-overlay feature in accordance with the invention introduces two special handover thresholds in addition to the normal handover thresholds:

SuperReuseGoodCiThreshold is a threshold used in the comparison of the downlink C/I ratio of the super-reuse TRX to initiate a handover to the super-reuse TRX.

SuperReuseBadCiThreshold is a threshold used in the comparison of the downlink C/I ratio of the super-reuse TRX to initiate a handover away from the super-reuse TRX. Both handover thresholds are composed of three parts: the actual threshold (CiRatio), the total number of comparisons (Nx) to be taken into account before a decision is possible, the number of comparisons out of total comparisons (Px) where the downlink C/I ratio has to be lower/greater than or equal to the threshold before any measures are possible. Each time the PSC receives measurement results from MS1 (e.g. after each SACCH multiframe), the BSC compares the downlink C/I ratio of specified super-reuse TRXs with a specified handover threshold. When the call is on a regular TRX, the threshold comparison concerns every super-reuse TRX of the serving cell and those child cells which are adjacent to the serving cell, and the handover threshold is SuperReuseGoodCiThreshold. If the call has been handed over to a super-reuse TRX, the threshold comparison concerns only the super-reuse TRX itself and the handover threshold is SuperReuse-BadCiThreshold.

The threshold comparison and the steps to be taken are as follows:

1) Comparison of the downlink C/I ratio $CI\_RATIO(k)$ with Super-ReuseGoodCiThreshold. If at least in Bx comparison out of the total Nx comparisons the downlink C/I ratio of the super-reuse TRX, $CI\_RATIO(k)$, is greater than or equal to the threshold CiRatio, a handover from a regular TRX to a super-reuse TRX(k) can be made on account of the good C/I ratio.

2) Comparison of the downlink C/I ratio $CI\_RATIO(k)$ with Super-ReuseBadCiThreshold. If at least in Bx comparison out of the total Nx comparisons the downlink C/I ratio of the super-reuse TRX, $CI\_RATIO(k)$, is lower than or equal to the threshold CiRatio, a handover from a super-reuse TRX(k) to a regular TRX is required on account of the bad C/I ratio.

3.5. Handover Decision Algorithms 3.5.1. Intra-cell Handover from a Regular TRX to a Super-Reuse TRX The BSC recognises the possibility to make a handover when the handover threshold comparison indicates that a handover, the cause of which is a good C/I ratio, can be made from a regular TRX to a specified super-reuse TRX. If there are several super-reuse TRXs in the serving cell which meet the handover requirements for the C/I ratio simultaneously, the handover algorithm ranks the super-reuse TRXs according to the C/I ratios. If there is an appropriate super-reuse TRX in the serving cell and in the child cell at the same time, the BSC prefers the child cell to the serving cell. In other words, the BSC performs an inter-cell handover to the child cell instead of the intra-cell handover.

3.5.2. Intra-cell Handover from a Super-Reuse TRX to a Regular TRX

The BSC recognises the necessity to make a handover when the handover threshold comparison indicates that some of the following criteria for a handover are present: downlink interference, downlink quality and bad C/I ratio. When the cause of the handover attempt is downlink interference or downlink quality and the intra-cell handover to a regular TRX fails, the BSC may perform a handover to another regular cell in order to maintain the call.

3.5.3. Intra-cell Handover Between Super-Reuse TRXs

The BSC recognises the necessity to make a handover when the handover threshold comparison indicates than an intra-cell handover, the cause of which is uplink interference, might be required. If the intra-cell handover attempt to another super-reuse TRX fails or the handover is not enabled, the BSC may perform either an intra-cell handover or an inter-cell handover to a regular TRX in order to maintain the call.

3.5.4. Inter-Cell Handover from a Regular Cell to a Child Cell

The BSC recognizes the possibility to make a handover when the handover threshold comparison indicates that a handover, the cause of which is a good C/I ratio, could be made from a regular TRX to a specified super-reuse TRX of the child cell. In order for the handover to the child cell to become possible, the child cell must also satisfy the following requirements for the radio link properties:

1. $AV\_RXLEV\_NCELL(n) > RXLEV\_MIN(n) + MAX(0, Pa)$ (5)

where $Pa = (MS\_TXPWR\_MAX(n) - P)$

2. $PBGT(n) > HO\_MARGIN\_PBGT(n)$ —

RXLEV_MIN(n) is the level which the signal level AV_RXLEV_NCELL(n) in the child cell (n) must exceed before the handover is possible. This parameter is set for each adjacent cell for the normal handover algorithm. MS_TXBWR_MAX(n) is the maximum RX power than an MS is permitted to use on a traffic channel in the adjacent cell. H_MARGIN_BGT(n) is the margin which the power budget PBGT(n) of the child cell (n) must exceed before the handover is possible. Also these are parameters that are set for each adjacent cell for the normal handover. B is the maximum power of the MS.

If there are appropriate super-reuse frequencies in many child cells, the BSC ranks the child cells according to priority levels and the load of the child cells and selects the best child cell to be the target cell. If there are several super-reuse TRXs in the child cell which meet the requirements for the C/I ratio simultaneously, the handover algorithm ranks the TRXs according to the C/I ratios.

3.5.5. Inter-Cell Handover from a Child Cell to a Regular Cell

The BSC recognises the necessity to make a handover when the handover threshold comparison indicates that some of the following criteria for a handover are present: downlink interference, downlink quality and bad C/I ratio. If there are several regular cells available, the BSC selects one regular cell which has the best signal strength condition to be the target cell. If there are no regular cells available within the area of the BSC, the BSC may initiate an inter-BSC handover caused by the conventional tradition criteria in order to maintain the call. After call set-up and after all handovers, there is preferably a given period of time during which the C/I evaluation is considered unreliable and the handover is not allowed. This period is allowed for the MS to decode the identifiers BSIC of the interfering/reference cells before the C/I evaluation is started. Furthermore, repeated handovers for the same MS are preferably prevented by setting a minimum interval between handovers related to the same connection. Furthermore, if a handover attempt fails for some reason, a new attempt to the same connection is only permitted after a minimum interval.

The figures and the description pertaining to them are only intended to illustrate the present invention. In its details, the present invention may vary within the scope and spirit of the attached claims.

What is claimed is:

1. A cellular radio network including allocated radio frequencies reused in cells, comprising:
   said allocated radio frequencies being divided into regular radio frequencies for which lower frequency reuse is utilized to achieve a seamless overall coverage, and super-reuse frequencies to which high frequency reuse is applied to provide a high traffic carrying capacity;
   at least one of said cells being a regular cell having both at least one regular frequency and at least one super-reuse frequency, so that said at least one regular frequency is intended to serve primarily in cell boundary regions and said at least one super-reuse frequency is intended to serve primarily in the vicinity of a base station, one of the regular frequencies being a BCCH frequency of the regular cell; and
   at least one microcell wherein all frequencies are super-reuse frequencies one of which is a BCCH frequency of the microcell;
   a controller which controls traffic load distribution in a regular cell between said at least one regular and said at least one super-reuse frequency by intra-cell handovers induced by estimated interference on said at least one super-reuse frequency, and which controls traffic load distribution between the regular cell and said microcell by inter-cell handovers based on estimated interference on at least one super-reuse frequency in the microcell.

2. The cellular radio network as claimed in claim 1, wherein a handover from a regular frequency to a super-reuse frequency occurs at a predetermined interference level on said super-reuse frequency, and
   wherein a handover from a super-reuse frequency to a regular frequency occurs when there is too poor an interference level on said super-reuse frequency.

3. The system as claimed in claim 1, wherein a BCCH frequency of the cell is a regular frequency, and wherein a radio frequency assigned in call-setup or handover from another cell is a regular frequency.

4. The cellular radio network as claimed in claim 1, further comprising:
   at least one microcell having only super-reuse frequencies, one of said super-reuse frequencies being a BCCH frequency, and
   call set-up in a microcell is barred, and said controller controls traffic load distribution between regular cells and said microcell by inter-cell handovers induced by an interference level in said microcell.

5. The cellular radio network as claimed in claim 1, comprising:
   a mobile-assisted handover procedure in which a mobile station measures a signal receiving level of a serving cell and a signal level of adjacent cells and forwards said measurement results to said handover controller of said cellular network, wherein said handover controller estimates an interference level on said super-reuse frequencies of said serving cell based on said measurement results.

6. The cellular radio network as claimed in claim 5, wherein one or more adjacent cells have been assigned to each super-reuse frequency of said serving cell, said measured receiving level of said adjacent cell being used to estimate interference on said super-reuse frequency.

7. The cellular radio network as claimed in claim 5, wherein said measurement results of said mobile station only concern a limited number of ambient cells, and that at least one reference cell has been assigned to at least one super-reuse frequency of said serving cell from among said ambient cells, said reference cell having an interference profile of a type similar to an interference profile of a more remote cell which is a potential source of interference on said super-reuse frequency but cannot be directly measured by said mobile station, and that said handover controller estimates said interference level caused by said more remote cell on said super-reuse frequency, using said measured signal level of said reference cell.

8. The cellular radio network as claimed in claim 7, wherein a handover algorithm is adapted to estimate a signal level of an interfering cell by correcting said measured receiving level of said reference cell taking into account a difference in signal levels of said reference cell and an actual interfering cell.

9. A method for increasing traffic carrying capacity in a cellular radio system, comprising:
   dividing radio frequencies of said cellular radio network into regular radio frequencies for which lower frequency reuse is utilized to achieve seamless overall coverage, and super-reuse frequencies to which higher frequency reuse is applied to provide a high traffic carrying capacity;
   allocating to some cells of said cellular radio network both at least one regular frequency and at least one super-reuse frequency so that said regular frequency is intended to serve primarily in cell boundary regions and said super-reuse frequency is intended to serve in a vicinity of a base station;
   allocating a regular frequency as a BCCH frequency in said some of the cells;
   providing at least one microcell wherein all frequencies are super-reuse frequencies one of which is a BCCH frequency of the microcell;
   controlling traffic load distribution in a regular cell between said at least one regular and said at least one super-reuse frequency by intra-cell handovers induced by estimated interference on said at least one super-reuse frequency; and
   controlling traffic load distribution between the regular cell and said microcell by inter-cell handovers based on estimated interference on at least one super-reuse frequency in the microcell.

10. The method as claimed in claim 9, further comprising:
   performing an intra-cell handover from a regular frequency to a super-reuse frequency when said super-reuse frequency has a predetermined interference level; and
   performing a handover from a super-reuse frequency to a regular frequency when said super-reuse frequency has too poor an interference level.

11. The method as claimed in claim 9, further comprising:
   allocating a regular frequency as a BCCH frequency of said cell in each case; and
   assigning a regular frequency in call set-up or in a handover from another cell in each case.

12. The method as claimed in claim 9, further comprising:
   measuring a signal receiving level and quality of a serving cell at said mobile station;
   measuring said signal receiving level of cells ambient to said serving cell at said mobile station;
   forwarding measurement results from said mobile station to said cellular radio network; and
   estimating an interference level on said super-reuse frequencies of said serving cell based on said measurement results.

13. The method as claimed in claim 12, further comprising:
   assigning one or more adjacent cells to each super-reuse frequency of said serving cell, said measured receiving level of the adjacent cell being used to estimate said interference level on said super-reuse frequency.

14. The method as claimed in claim 12,
   wherein said measurement results reported by said mobile station only concern a limited number of ambient cells,
   said method further comprising:
   assigning at least one reference cell to at least one super-reuse frequency of said serving cell from among said ambient cells, said reference cell having an interference profile of a type similar to an interference profile of a more remote cell which is a potential source of interference on said super-reuse frequency but cannot be directly measured by said mobile station, and
   estimating an interference level caused by said more remote cell on said super-reuse frequency using said measured signal level of said reference cell.

15. The method as claimed in claim 14, further comprising:
   correcting said measured signal level of said reference cell taking into account a difference in signal levels of said reference cell and said remote cell in estimating said interference level.

16. A network element for controlling traffic load distribution in a cellular radio system, comprising
   means for allocating to some of radio cells both at least one regular frequency and at least one super-reuse frequency so that the regular frequency is intended to serve primarily in cell boundary regions and the super-reuse frequency is intended to serve primarily in the vicinity of a base station;
   means for allocating a regular frequency as a BCCH frequency in said some of the cells;
   means for allocating to a super-reuse frequency as a BCCH frequency in at least one microcell in which all frequencies are super-reuse frequencies;
   means for controlling traffic load distribution in the regular cell between said at least one regular and said at least one super-reuse frequency by means of intra-cell handovers induced by estimated interference on said at least one super-reuse frequency; and
   means for controlling traffic load distribution between the regular cell and said microcell by inter-cell handovers based on estimated interference on at least one super-reuse frequency in the microcell.

17. A network element for controlling traffic load distribution in a cellular radio system, comprising means for allocating to some of radio cells both at least one regular frequency and at least one super-reuse frequency so that the regular frequency is intended to serve primarily in cell boundary regions and the super-reuse frequency is intended to serve primarily in the vicinity of a base station;

means for allocating a regular frequency as a BCCH frequency in said some of the cells, such that in said some of the cells a radio frequency assigned in call-setup and handover from another cell is always a regular frequency; and means for controlling traffic load distribution in the regular cell between said at least one regular and said at least one super-reuse frequency by means of intra-cell handovers induced by estimated interference on said at least one super-reuse frequency.

* * * * *

UNITED STATES PATENT AND TRADEMARK OFFICE
CERTIFICATE OF CORRECTION

| | | |
|---|---|---|
| PATENT NO. | : 6,985,736 B1 | |
| APPLICATION NO. | : 09/480173 | |
| DATED | : January 10, 2006 | |
| INVENTOR(S) | : Risto Aalto | |

It is certified that error appears in the above-identified patent and that said Letters Patent is hereby corrected as shown below:

On the Title Page,
Item (75) Inventors: should read,

Risto Aalto, Riihimaki, Finland
Esa Tuovinen, Espoo, Finland
Timo Halonen, Helsinki, Finland Signed and Sealed this
Twenty-third Day of August, 2011

David J. Kappos
*Director of the United States Patent and Trademark Office*